(12) United States Patent
Hengstler

(10) Patent No.: US 12,098,943 B2
(45) Date of Patent: Sep. 24, 2024

(54) MEASURING DEVICE FOR DETECTING A FILLING OR LIMIT LEVEL OF A FILLING MATERIAL IN A CONTAINER AND METHOD FOR FILLING OR EMPTYING A CONTAINER WITH OR OF A FILLING MATERIAL

(71) Applicant: VEGA GRIESHABER KG, Wolfach (DE)

(72) Inventor: Clemens Hengstler, Haslach (DE)

(73) Assignee: VEGA GRIESHABER KG, Wolfach (DE)

( * ) Notice: Subject to any disclaimer, the term of this patent is extended or adjusted under 35 U.S.C. 154(b) by 0 days.

(21) Appl. No.: 17/769,929

(22) PCT Filed: Dec. 19, 2019

(86) PCT No.: PCT/EP2019/086397
§ 371 (c)(1),
(2) Date: Apr. 18, 2022

(87) PCT Pub. No.: WO2021/121605
PCT Pub. Date: Jun. 24, 2021

(65) Prior Publication Data
US 2023/0035628 A1    Feb. 2, 2023

(51) Int. Cl.
*G01F 23/80*  (2022.01)
*G01F 23/22*  (2006.01)
*G01F 25/20*  (2022.01)
*H01M 10/46*  (2006.01)

(52) U.S. Cl.
CPC .............. *G01F 23/80* (2022.01); *G01F 23/22* (2013.01); *G01F 25/24* (2022.01); *H01M 10/465* (2013.01)

(58) Field of Classification Search
None
See application file for complete search history.

(56) References Cited

U.S. PATENT DOCUMENTS

| | | | |
|---|---|---|---|
| 6,192,752 B1 | 2/2001 | Blaine | |
| 2009/0107580 A1* | 4/2009 | Enge | B60K 15/035 141/95 |
| 2010/0106446 A1 | 4/2010 | Ashrafzadeh | |
| 2013/0335262 A1* | 12/2013 | Nilsson | G01F 23/284 342/124 |

(Continued)

FOREIGN PATENT DOCUMENTS

| DE | 202019001575 U1 | 5/2019 |
|---|---|---|
| EP | 2256566 A1 | 12/2010 |

OTHER PUBLICATIONS

International search report for action for related International application PCT/EP19/086397, issued on Sep. 8, 2020.

*Primary Examiner* — Patrick Assouad
*Assistant Examiner* — Mark A Shabman
(74) *Attorney, Agent, or Firm* — William Gray Mitchell

(57) ABSTRACT

A measuring apparatus for detecting a fill level or limit level of a filling material in a container, wherein the measuring apparatus is designed to be situated on the container and comprises a sensor for determining the fill or limit level, a power supply unit which is electrically connected to the sensor and is designed and configured to supply the sensor with electrical power, an activation unit which is connected at least to the power supply unit for signal communication and an associated method of use.

3 Claims, 1 Drawing Sheet

(56) References Cited

U.S. PATENT DOCUMENTS

2016/0116324 A1* 4/2016 Job ..................... G01F 23/804
                                                    73/290 V
2016/0223382 A1* 8/2016 Luber ................ G01F 23/0007

* cited by examiner

MEASURING DEVICE FOR DETECTING A FILLING OR LIMIT LEVEL OF A FILLING MATERIAL IN A CONTAINER AND METHOD FOR FILLING OR EMPTYING A CONTAINER WITH OR OF A FILLING MATERIAL

CROSS REFERENCE TO RELATED APPLICATIONS

This patent application claims priority International Patent Application PCT/EP2019/086397, filed on Dec. 19, 2019.

STATEMENT REGARDING FEDERALLY SPONSORED RESEARCH OR DEVELOPMENT

No federal government funds were used in researching or developing this invention.

NAMES OF PARTIES TO A JOINT RESEARCH AGREEMENT

Not applicable.

SEQUENCE LISTING INCLUDED AND INCORPORATED BY REFERENCE HEREIN

Not applicable.

BACKGROUND

Field of the Invention

The invention is a measuring device for detecting a filling or limit level of a filling material in a container and method for filling or emptying a container with or of a filling material.

Background of the Invention

Measuring devices for detecting a filling or limit level of filling materials in containers are well-known from the prior art. In this case, the measuring devices may be based on different physical or mechanical measuring methods with which a filling level, e.g. a filling height, of a filling material in a container, such as in a tank, a basin or a silo, can be detected. The containers may be closed or partially opened systems. The filling height of the filling material determined with the underlying measuring method is generally converted into an electronic signal. If a certain filling level, e.g. a maximum admissible or desired filling level, is externally predetermined, it is generally referred to as the limit level. In contrast to a filling level measurement that is generally carried out in a continuous manner—in this case, the filling level is detected continuously—the filling level or filling height is not determined, in the case of a limit level measurement, at every point in time; rather, the filling level or the filling height is detected upon reaching a predefined filling level, particularly a filling height.

Frequently, the measuring methods used for detecting a filling or limit level are time-of-flight-based methods, such as radar or ultrasound, hydrostatic methods (e.g. pressure measurements), capacitive or radiometric methods. Also, optical methods may be used for determining the filling or limit level.

Measuring devices for detecting a filling or limit level may be used in filling or limit level measurements of filling materials of different types, particularly for solid or liquid filling materials. Powders, granules or other bulk material may be mentioned as examples of solid filling materials. Gel-like, pasty or viscous substances may also be considered solid filling materials. In particular, aqueous or oily substances may be liquid filling materials.

Measuring devices for measuring a filling level or limit level have in common that they have at least one sensor oriented in the direction of the filling material to be subjected to a measurement. In particular, the sensors are mounted directly on or in the containers in which a filling material is located or into which a filling material is filled. In particular, mechanical fastening means are used for attachment, e.g. fastening means based on screw connections, clamping connections, positive or non-positive connections or magnetic connections.

Such measuring devices for measuring filling levels or limit levels arranged on or attached to a container require an energy supply for functional operation. In measuring devices known from the prior art, this is generally realized by means of stationary energy supply devices that are connected to a corresponding (electrical) energy supply terminal of the measuring device. The electrical connection provided in this case between the energy supply device and the measuring device may be configured, in particular, in the form of an electrical cable connection.

A disadvantage of such a stationary energy supply is that it is strongly tied to its location, which results in the filling or emptying of a container having to take place in the vicinity of a corresponding energy supply device of the measuring device. Corresponding measuring devices-which can only be electrically operated using a stationary energy supply device—are unsuitable particularly for use with mobile containers, e.g. transport containers. Moreover, such an external energy supply requires suitable terminals to be provided on the measuring device and the external energy supply device (e.g. an energy source) to be provided. Thus, the constructive effort in manufacturing the measuring device is increased and the range of use of the measuring device is limited.

Though, in contrast, battery-operated measuring devices for measuring a filling level or limit level are known, which permit a location-independent deployment of the measuring devices in the sense of a filed device (e.g. on a mobile container), however, the known systems generally lack sufficient efficiency of use with regard to the energy provided by the battery. In other words, this means that the known systems lack, in particular, a sufficient capability of differentiating between different energy requirement states, particularly those states in which an energy supply of the measuring device with energy has to be provided actively (e.g. when filling or emptying a container with or of filling material), and those states in which a full capacity energy supply of the measuring device is not required.

To ensure a safe transport of mobile containers, it is worthwhile to fill them only with filling material up to a certain filling level. As was already mentioned, arranging measuring devices for detecting a filling or limit level directly on the containers is known from the prior art. In this case, however, it is generally necessary—prior to filling—to manually connect the measuring devices arranged on the containers to a control system of the filling or emptying device. The automatic coupling of a measuring device arranged on such a container to the filling or emptying device is not, or only insufficiently, described in the prior art. This also applies to emptying processes of containers filled with filling material.

Accordingly, the present invention is based on the object of providing a measuring device for detecting a filling or limit level of a filling material in a container, with which an at least partially automated, energy self-sufficient, reliable and error-reduced operation is made possible. Moreover, the present invention is based on the object of providing a method for filling or emptying a container with or of a filling material, in which the filling or emptying of a container with or of a filling material can be carried out at least partially in an automated and energy self-sufficient manner and in which, in addition, increased reliability and safety is ensured.

In order to accomplish this object, a measuring device having the features as disclosed herein. Other particularly advantageous embodiments of the invention are disclosed by the respective dependent claims.

BRIEF SUMMARY OF THE INVENTION

In a preferred embodiment, a measuring device (1) for detecting a filling or limit level of a filling material (2) in a container (3), wherein the measuring device (1) is configured for being arranged on the container (3), comprising a sensor (4) for determining the filling or limit level, an energy supply unit (5), which is electrically connected to the sensor (4) and configured and adapted for supplying the sensor (4) with electrical energy, and an activation unit (6), which is connected, with regard to signaling, at least to the energy supply unit (5), characterized in that the activation unit (6) is configured and adapted to activate the sensor (4), and switch it from an inactive mode into an operating mode, subsequent to an actuation, particularly when the container (3) is being connected to a filling or emptying device (7), by an actuating means (8a, 8b) provided on the container (3) and/or the filling or emptying device (7).

In another preferred embodiment, the measuring device (1) as described herein, characterized in that the activation unit (6) is configured to switch the sensor (4) from an inactive mode into an operating mode by means of an activation of the energy supply between the energy supply unit (5) and the sensor (4).

In another preferred embodiment, the measuring device (1) as described herein, characterized in that the energy supply unit comprises at least one battery or one rechargeable battery.

In another preferred embodiment, the measuring device (1) as described herein, characterized in that the activation unit (6) can be actuated mechanically, electrically, optically, optoelectronically, magnetically or electromagnetically.

In another preferred embodiment, the measuring device (1) as described herein, characterized in that the measuring device (1) is configured and adapted to perform, subsequent to the activation of the sensor (4), a functionality test in which a functionality evaluation for determining a positive or negative functionality of the sensor (4) is carried out, and to forward a filling or emptying enable signal to a control unit (9a, 9b) associated with the container (3) and/or the filling or emptying device (7) in the case of a positive functionality.

In another preferred embodiment, the measuring device (1) as described herein, characterized in that the measuring device (1) is configured and adapted to forward, subsequent to the determination of the filling or limit level and an assertion that a predetermined filling or limit level has been reached, a filling or emptying process termination signal in the direction of the control unit (9a, 9b) associated with the container (3) and/or the filling or emptying device (7).

In another preferred embodiment, the measuring device (1) as described herein, characterized in that the measuring device (1) is configured and adapted to switch the sensor (4) from an operating mode into an inactive mode subsequent to the termination of a filling or emptying process.

In another preferred embodiment, the measuring device (1) as described herein, characterized in that the sensor (4) is a vibration sensor, a capacitive sensor, an impedance sensor, a radar sensor, an optical sensor or a TDR sensor.

In another preferred embodiment, the measuring device (1) as described herein, characterized by a communication unit configured and adapted to receive or emit signals in a wireless or wired manner, e.g. from or to the control unit (9a, 9b) associated with the container (3) and/or the filling or emptying device (7).

In another preferred embodiment, the measuring device (1) as described herein, characterized in that the measuring device (1) is configured and adapted for carrying out a signal exchange, e.g. a data handshake, between the measuring device (1) and the control unit (9a, 9b) associated with the container (3) and/or the filling or emptying device (7) prior to or during the filling or emptying of the container (3).

In another preferred embodiment, the measuring device (1) as described herein, characterized by an energy generation unit, in particular a solar unit, which is electrically connected to the energy supply unit (5) and configured and adapted for charging the energy supply unit (5).

In another preferred embodiment, a method for filling or emptying with or of a filling material (2) a container (3) with a filling material (2) using a filling or emptying device (7) and a measuring device (1), which is configured as described herein and arranged on the container (3), wherein the measuring device (1) comprises: a sensor (4) for determining the filling or limit level, an energy supply unit (5), which is electrically connected to the sensor (4), and an activation unit (6), which is connected, with regard to signaling, at least to the energy supply unit (5), comprising the following steps:
  connecting the filling or emptying device (7) to the container (3);
  actuating the activation unit (6) by an actuating means (8a, 8b) provided on the container (3) and/or the filling or emptying device (7), wherein the actuation takes place during or subsequent to step a);
  subsequent to method step b): activating the sensor (4) and switching the same from an inactive mode into an operating mode;
  filling or emptying the container (3) with the filling material (2), wherein the filling or limit level is determined continuously or discontinuously using the sensor (4) during the filling or emptying,
  upon reaching a predetermined filling or limit level: terminating the filling process;
  after the termination of the filling process or emptying process: switching the sensor (4) from an operating mode into an inactive mode.

In another preferred embodiment, the method according for filling or emptying as described herein, characterized in that, subsequent to the activation of the sensor (4), a functionality test is performed in which a functionality evaluation of the sensor (4) is carried out, and a filling or emptying enable signal is forwarded to a control unit (9a, 9b) associated with the container (3) and/or the filling or emptying device (7) in the case of a positive decision.

In another preferred embodiment, the method according for filling or emptying as described herein, characterized in that the measuring device (1), subsequent to a respective determination of the filling or limit level, compares the determined filling or limit level with a predetermined filling or limit level, and that the measuring device (1) forwards a filling or emptying process termination signal in the direction of the control unit (9a, 9b) associated with the container (3) and/or the filling or emptying device (7), e.g. via the communication unit, in the case of the predetermined filling or limit level having been reached.

In another preferred embodiment, the method according for filling or emptying as described herein, characterized in that a signal exchange, e.g. a data handshake, is carried out between the measuring device (1) and the control unit (9a, 9b) associated with the container (3) and/or the filling or emptying device (7) prior to or during the filling or emptying of the container (3) with or of the filling material (2).

DETAILED DESCRIPTION OF THE INVENTION

Figure 1:
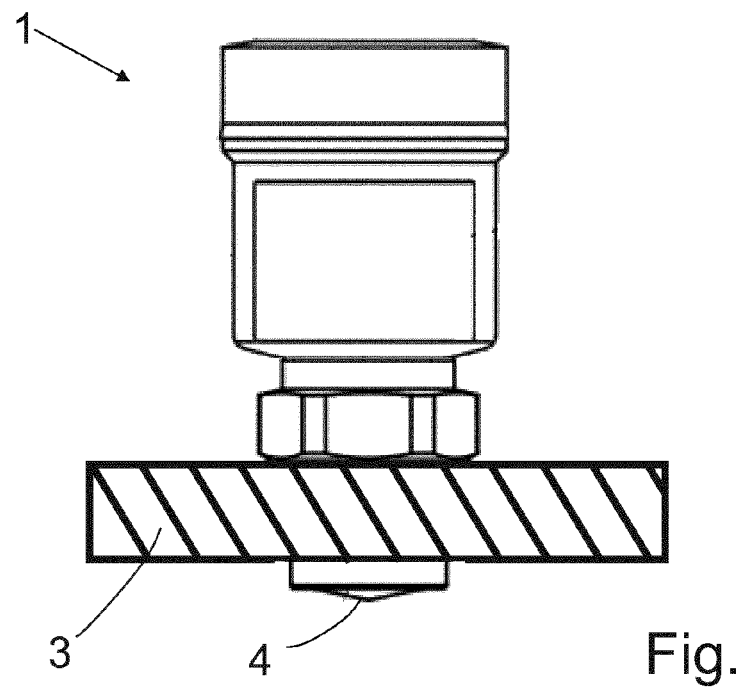
FIG. 1 is a schematic representation of a variant for attaching to a container a measuring device for measuring a filling level or limit level.

A measuring device for detecting a filling or limit level of a filling material in a container, wherein the measuring device is configured for being arranged on the container, comprising a sensor for determining the filling or limit level, an energy supply unit, which is electrically connected to the sensor and configured and adapted for supplying the sensor with electrical energy, and an activation unit, which is connected, with regard to signaling, at least to the energy supply unit. In this case, the activation unit is configured and adapted to activate the sensor, and switch it from an inactive mode into an operating mode, subsequent to an actuation, particularly when the container is being connected to a filling or emptying device, by an actuating means provided on the container and/or the filling or emptying device.

The measuring device proposed according to the invention may be based on various measuring methods for filling or limit level measurement, particularly, however, on a contactless measuring method for determining the filling or limit level. In this case, contactless means that the sensor preferably does not come into contact with the filling material during the measurement of the filling or limit level. However, this does not exclude individual particles, droplets or the like coming into contact with the sensor during filling or emptying. Rather, a contactless measurement in this context is to be understood to mean that the measurement of the filling or limit level as such is based on a contactless measurement. As was mentioned in the introduction, such a contactless measurement may be, in particular, time-of-flight-based methods, such as radar or ultrasound, hydrostatic methods (e.g. pressure measurements), capacitive or radiometric methods. Basically, optical methods may also be used for measuring the filling or limit level.

As was already mentioned, the measuring device is configured for being arranged on the container. In this case, an "arrangement" may be understood to mean a non-detachable or detachable attachment of the measuring device to the container. In this case, the position in space for arranging the measuring device, particularly the sensor, on the container is not defined. For example, it may be provided that the measuring device, particularly the sensor, is embedded or screwed into a wall of the container. It is equally conceivable that the measuring device is screwed or welded to an inner wall of the container or attached thereto via a positive or non-positive connection or in other ways. Preferably, at least a part of the sensor is arranged in the inner space of the container or protrudes into it, in particular in order to ensure that signals emanating from the sensor can be emitted in the direction of the filling material located in the container, and that signals radiated, backscattered, reflected or emitted by or on the filling material can be detected by the sensor.

As was already mentioned, the measuring device proposed with the invention also comprises an energy supply unit and an activation unit in addition to the sensor. These components associated with the measuring device may be assembled in a common housing, but may also be arranged separately, as long as an electrical connection between the energy supply unit and the sensor and a signaling connection between the activation unit and the energy supply unit are ensured. In this case, the electrical connection may be realized in a wired manner, e.g. via flexible cables, such as a ribbon cable, or other electrical conductors. Such conductors may also be, for example, conductor paths formed on a circuit board. Equally, an electrical connection via suitable plug-in connectors or connecting wires is possible. The electrical connection may provide a current or voltage transmission between the energy supply unit and the sensor, but also be configured for transmitting signals, e.g. in the form of electrical voltages. The signaling connection between the activation unit and the energy supply unit may be a wired connection or a wireless connection.

According to the invention, the activation unit is configured and adapted to activate the sensor, and switch it from an inactive mode into an operating mode, subsequent to an actuation, particularly when the container is being connected to the filling or emptying device, by an actuating means provided on the container and/or the filling or emptying device. It is thus made possible to operate the sensor in a needs-based manner and switch it into an operating mode only in those situations in which a measurement of the filling or limit level is actually required. In this case, it is advantageous to switch the sensor into an operating mode only if the actual filling or emptying of the container is about to take place. To this end, it may be provided that the sensor is activated by the actuating means provided on the container and/or the filling or emptying device when the container is being connected to a filling or emptying device, particularly to a tube or nozzle associated with the filling or emptying device. An "inactive mode" may be understood to be a state in which the sensor has no or a reduced energy supply, particularly compared with an energy supply provided in the operating mode. Accordingly, an "inactive mode" may also be understood to be a sleep mode in which a reduced energy supply is provided.

For activation, the activation unit may forward a control signal to the energy supply unit, subsequent to which the energy supply of the sensor is provided by the energy supply unit and the sensor is switched into an operating mode. The useful voltage or useful current provided in the process may deviate from an inactive voltage or an inactive current provided in the inactive mode. In particular, the useful voltage or useful current may assume higher values than the inactive voltage and the inactive current. The inactive voltage or inactive current may be zero. The inactive voltage and the inactive current, compared with the useful voltage and the useful current, may also assume a reduced value, with which, however, a basic supply of the sensor can be ensured. The latter may correspond to the sleep mode. Accordingly, the sensor may be supplied with a predeterminable inactive voltage or inactive current also in the inactive mode, in particular in order to enable a rapid activation or signal reception of an activation signal.

The actuating means provided on the container and/or the filling or emptying device has a signal connection or other operative connection, e.g. an (electro-)mechanical one, with the activation unit. When the container is being connected to the filling or emptying device, first, the activation unit is actuated by means of the actuating means, e.g. by means of forwarding a control signal (via the signal connection) or an (electro-)mechanical contacting. The actuating means provided on the container and/or the filling or emptying device is also activated when the container is being connected to the filling or emptying device, in particular in order to cause or perform an actuation of the activation unit.

Compared with the systems known from the prior art, the measuring device according to the invention has an advantageous energy utilization or energy efficiency, which is based on the principle of a needs-based energy supply. Particularly in the case of mobile containers, which are used in the industry as transport, waste or disposal containers, such a needs-based energy supply of a measuring device arranged on the container is advantageous. Because of it, an energy supply required for the operation of the sensor is provided only if needed during filling or emptying, i.e. when the container is being connected to the filling or emptying device. At those times when no filling process takes place, the sensor is in an inactive mode in which-compared with the operating mode-no, or a reduced, energy supply of the sensor has to be provided. An unnecessary or excessive energy supply of the sensor at those times in which the sensor is not used is thus avoided. Moreover, such a configuration results in an increased life of the measuring device, particularly if a battery or a rechargeable battery is provided as a component or energy source of the energy supply unit.

Other advantageous embodiments of the invention, particularly of the measuring device of the present invention, are specified in the dependent claims. The embodiments specified in the dependent claims and other advantageous embodiments of the invention are described below.

According to an advantageous embodiment of a measuring device according to the invention, it may be provided that the activation unit is configured to switch the sensor from an inactive mode into an operating mode by means of an activation of the energy supply between the energy supply unit and the sensor. As was already mentioned above, the change in status of the sensor from the inactive mode into the operating mode is caused by an activation of the energy supply between the energy supply unit and the sensor. Preferably, the activation unit does not directly activate the sensor as such, but causes the energy required in an operating mode of the sensor to be provided via the energy supply unit. Thus, an embodiment is advantageous in which the activation unit forwards to the energy supply unit a signal or a command for providing the energy, e.g. a useful voltage or useful current, required for operating the sensor. The forwarded command may be an electrical signal, in particular an electric pulse. The signal can be forwarded in an analog or digital manner. On the energy supply unit side, a receiving interface may be provided, which is configured and adapted to receive the signal, in particular an activation signal, forwarded by the activation unit. In this case, the receiving interface or a microcontroller connected therewith is configured and adapted for initiating the energy supply of the sensor subsequent to receiving the activation signal.

According to another advantageous embodiment of a measuring device according to the invention, it may be provided that the energy supply unit comprises at least one battery or one rechargeable battery. In this case, the battery or rechargeable battery act as energy storage means providing the energy required for supplying the sensor in the operating mode. Batteries and rechargeable batteries are operated on an electrochemical basis. Other energy storage means may also fulfil such a function in a measuring device according to the invention. In addition, it may be provided that the battery or rechargeable battery (or other energy storage means) provide the energy supply of the sensor in the inactive mode, in particular an inactive voltage or an inactive current, wherein the inactive voltage or inactive current assume a lower value than the useful voltage or useful current required during operation of the sensor. In that case, in which the sensor does not have an energy supply (fully turned-off state), the inactive voltage or the inactive current are equal to zero. Moreover, it may be provided that the energy supply unit, particularly the battery or the rechargeable battery (or another energy storage means) provides the energy supply for further components of the measuring device (in addition to the sensor). Within the context of the present invention, a "battery" or "rechargeable battery" is not necessarily to be understood to mean a single battery or single rechargeable battery; rather, this could also denote a plurality of batteries (e.g. a battery pack) or a plurality of rechargeable batteries (e.g. a rechargeable battery pack). Within the sense of the invention, a "rechargeable battery" is to be understood to mean a rechargeable energy storage means.

According to another advantageous embodiment of a measuring device according to the invention, it may be provided that the activation unit can be actuated mechanically, electrically, optically, magnetically or electromagnetically. As was already mentioned above, the activation unit can activate the sensor, or initiate the supply of the sensor with the energy required in the operating mode, subsequent to an actuation by means of an actuating means provided on the container and/or the filling or emptying device. As the "and/or" conjunction mentioned above in regard of the arrangement of the actuating means indicates, the actuating means may include a component solely arranged on the container or solely arranged on the filling or emptying device, or have at least a two-part structure, wherein in this case, at least one component of the actuating means is arranged on the container, and one component of the actuating means on the filling or emptying device. When the filling or emptying device is being connected to the container, the two components may then cooperate (e.g. via a mechanical or electrical contact) and together cause an actuation of the activation unit.

As was mentioned, the activation unit can be actuated mechanically. To this end, the activation unit may include an interface that can be actuated mechanically, e.g. a switch or lever, which can be actuated particularly by means of a mechanical actuating means (e.g. a rod assembly or a plunger). When the filling or emptying device is being connected to the container, the (mechanical) actuating means is caused to move or a corresponding mechanical mechanism is triggered, whereby the mechanical interface of the activation unit can be directly or indirectly actuated.

Moreover, the activation unit may be capable of being actuated electrically and have an electrical interface in order to receive electrical actuation signals emitted by the actuating means. Electrical actuation signals may be electrical voltages or currents, for example.

In particular, an optical actuation is to be understood to mean the emission of an optical signal, e.g. of a light or laser pulse via a light-emitting or laser diode, by the actuating means and the reception of the optical signal by an optical interface of the activation unit. An electrical signal can be generated from the received optical signal; accordingly, the actuation may also take place optoelectronically. For example, the optical interface may be a camera unit, a photodiode, a photosensitive resistor or a photo transistor. This list is not complete.

A magnetic actuation may be understood to mean the convergence of two magnets (they may have the same or opposite polarity). In this case, one magnet may be arranged on the side of the actuating means and one magnet on the side of the activation unit. When a defined magnetic flux density is reached at a predetermined point in space, the actuation of the activation unit may be triggered. The magnetic flux density may be determined by means of a magnetic field sensor, e.g. a Hall sensor. The above-mentioned magnets may be permanent magnets or electromagnets. The actuation between the actuating means and the activation unit may also take place by means of a Reed switch.

An electromagnetic actuation is to be understood to mean the emission of an electromagnetic signal with a predetermined frequency in the direction of a receiver designed for receiving such an electromagnetic signal on the side of the activation unit. After receiving the signal, the activation unit initiates the activation of the sensor. In this case, the receiver may be configured exclusively for receiving the signals ("receive mode") or, alternatively, for receiving and transmitting signals ("transmit receive mode"). The unit provided on the side of the actuating means may also be either configured as a mere transmitting unit ("transmit mode") or as a "transmit-receive" unit. In particular, an electromagnetic transmitting and/or receiving unit may comprise an antenna, e.g. in the form of a radio frequency coil incorporated into an rf resonant circuit.

According to another advantageous embodiment of a measuring device according to the invention, it may be provided that the measuring device is configured and adapted to perform, subsequent to the activation of the sensor, a functionality test in which a functionality evaluation for determining a positive or negative functionality of the sensor is carried out, and to forward a filling or emptying enable signal to a control unit associated with the container and/or the filling or emptying device in the case of a positive functionality. Thus, the functionality test may be carried out, in particular, as soon as the supply of the sensor with a useful voltage or a useful current required in the operating mode is ensured. When the functionality test is carried out, the energy supply of the sensor may be checked; equally, however, a test or reference measurement, e.g. in the sense of a zero point measurement, may also be carried out. A calibration routine or a checking routine may also be the subject matter of the functionality test. Due to such a functionality test and the enabling of the filling or emptying process coupled therewith, the process reliability while filling or emptying a container with or of a filling material is inherently increased, because the likelihood of a malfunction of the sensor is thus reduced. In the case of an incorrect determination of the filling or limit level, there is the danger of an overfilling of or spillage from the container. In addition, the maximum filling weight of the container may be limited in some applications, e.g. for reasons related to transport, which is why it is important to avoid exceeding such a filling weight. In this regard, the functionality test offers a remedy. If a negative functionality is found, it may be provided that the functionality test be repeated or to refuse the enable signal.

According to another advantageous embodiment of a measuring device according to the invention, the measuring device may comprise a communication unit configured and adapted to receive or emit (i.e. to transmit) signals in a wireless or wired manner, e.g. from or to the control unit associated with the container and/or the filling or emptying device. A wireless transmission may in this case be understood to mean near field or far field communication. In particular, a radio connection is an option in this respect, which may be based on all communication standards that are known at the time of the application or will be developed in the future. The communication unit may be coupled to the energy supply unit. Preferably, the communication unit can receive signals also in the case of a voltage or current supply corresponding to the inactive voltage or inactive current. It may be provided, however, subsequent to the reception of the signal, to supply the communication unit with a useful voltage or useful current above the inactive voltage or inactive current.

According to another advantageous embodiment of a measuring device according to the invention, it may be provided that the measuring device is configured and adapted to forward, subsequent to the determination of the filling or limit level and an assertion that a predetermined filling or limit level has been reached, a filling or emptying process termination signal in the direction of the control unit associated with the container and/or the filling or emptying device. In particular, this may occur via the above-mentioned communication unit. The control unit associated with the container and/or the filling or emptying device may also include a corresponding communication unit or receiving unit with which the above-mentioned filling or emptying process termination signal can be acquired. The above-mentioned filling or emptying enable signal may also be transmitted to the control unit associated with the container and/or the filling or emptying device via the communication unit of the measuring device. Subsequent to the filling or emptying process termination signal having been forwarded to the control unit of the container and/or the filling or emptying device, a valve or a valve assembly may be closed, for example. The valve or valve assembly may be arranged on the filling or emptying device but, alternative or additionally, also on the container. Also, a nozzle of the filling or emptying device may have a mechanism which, when a filling or emptying process termination signal is forwarded, prevents a further filling or emptying of the container with or of filling material. Moreover, another stop mechanism of the container and/or the filling or emptying device, which prevents the container from being filled or emptied, may be activated subsequent to the filling or emptying process termination signal having been forwarded.

According to another advantageous embodiment of a measuring device according to the invention, it may be provided that the measuring device is configured and adapted to switch the sensor from an operating mode into an inactive mode subsequent to the termination of a filling or emptying process. Subsequent to a filling or emptying process having been completed, there is generally no longer a need for maintaining an active operating mode of the sensor. Accordingly, it is advantageous, after the filling or emptying of the container has been completed, i.e. in a state in which an active sensing of the filling or limit level is no longer necessary, to electrically supply the sensor only with an inactive voltage or inactive current, so that a filling or limit level measurement can no longer be carried out in such an inactive mode, but a sufficient energy supply is provided in order to switch the sensor into an operating mode within a short time. Moreover, a complete shut-down of the sensor may be provided in the inactive mode.

According to another advantageous embodiment of a measuring device according to the invention, it may be provided that the sensor is a vibration sensor, a capacitive sensor, an impedance sensor, a radar sensor, an optical sensor or a TDR sensor. In addition, the measuring device may have a redundant configuration and include a plurality of the above-mentioned sensors of the same or different types. The functional principles of the above-mentioned sensor types are generally known from the prior art, which is why they are not to be discussed in any more detail at this point.

According to another advantageous embodiment of a measuring device according to the invention, it may be provided that the measuring device is configured and adapted for carrying out a signal exchange, e.g. a data handshake, between the measuring device and the control unit associated with the container and/or the filling or emptying device prior to or during the filling or emptying of the container with the filling material. By means of such a signal exchange between the measuring device and the control unit associated with the container and/or the filling or emptying device, it can be ensured that a container provided with a measuring device is connected to the correct or desired filling or emptying device. Information provided for recognition or identification may be mutually exchanged and verified by means of the signal exchange, particularly prior to the start of the filling process. Alternatively or additionally, it may be provided to perform a signal exchange, e.g. a data handshake, between the measuring device and the control unit associated with the container and/or the filling or emptying device also during the filling or emptying process. Thus, measurement data (which may be raw data of the filling or limit level measurement, for example, or evaluated information regarding the filling or limit level) may be transmitted to the control unit also during the filling process or the emptying process. Conversely, filling process-related or emptying process-related data, which may possibly be taken into account in the filling level or limit level measurement, may also be transmitted from the control unit in the direction of the measuring device. Possible operating errors may also be exchanged bidirectionally between the control unit and the measuring device. The reliability and process safety of the measuring device and the component cooperating therewith is further improved by such a configuration.

According to another advantageous embodiment of a measuring device according to the invention, the measuring device may comprise an energy generation unit, in particular a solar unit, which is electrically connected to the energy supply unit and configured and adapted for charging the energy supply unit. The capability for mobile use of the measuring device is further optimized by such a configuration. In the case of such a configuration, the necessity of a replacement of the energy storage means (e.g. of a battery or a rechargeable battery in case of loss of its charging capacity) is avoided. Manually charging is also not required given such a configuration.

In addition to the above-described measuring device according to the invention and the associated advantageous features of the embodiments, the object according to the invention is achieved with a method for filling or emptying a container with or of a filling material. The above-mentioned advantageous embodiments of a measuring device according to the invention are also suitable as features of embodiments of a method according to the invention.

According to the invention, a method is proposed for filling or emptying a container with or of a filling material using a filling or emptying device and a measuring device, which is configured in accordance with the invention and arranged on the container, wherein the measuring device comprises: a sensor for determining the filling or limit level, an energy supply unit, which is electrically connected to the sensor, and an activation unit, which is connected, with regard to signaling, at least to the energy supply unit, comprising the following steps:

connecting the filling or emptying device to the container;
actuating the activation unit by an actuating means provided on the container and/or the filling or emptying device, wherein the actuation takes place during or subsequent to step a);
subsequent to method step b): activating the sensor and switching the same from an inactive mode into an operating mode;
filling or emptying the container with the filling material, wherein the filling or limit level is determined continuously or discontinuously using the sensor during the filling or emptying,
upon reaching a predetermined filling or limit level: terminating the filling process or emptying process;
after the termination of the filling process or emptying process: switching the sensor from an operating mode into an inactive mode.

In the above-mentioned method step a), a nozzle, in particular, which is arranged on a pipe of the filling or emptying device, may be arranged on and locked to a filling opening or an outlet opening formed on the container. The connection may take place manually, in a partially or fully automated manner.

According to an advantageous embodiment of a method according to the invention, it may be provided that, subsequent to the activation of the sensor, a functionality test is performed in which a functionality evaluation of the sensor is carried out, and a filling or emptying enable signal is forwarded to a control unit associated with the container and/or the filling or emptying device in the case of a positive decision (regarding the functionality). However, in the case of a negative decision (regarding the functionality), i.e. in the case in which no sufficient functionality of the sensor can be determined, no filling or emptying enable signal is forwarded to the control unit. In this case, it may be provided that the functionality test be repeated, or that a warning signal, e.g. an acoustic or visual warning signal, be issued via display means.

According to another advantageous embodiment of a method according to the invention, it may be provided that the measuring device, subsequent to a respective determination of the filling or limit level, compares the determined filling or limit level with a predetermined filling or limit level, and that the measuring device forwards a filling or emptying process termination signal in the direction of the control unit associated with the container and/or the filling or emptying device, e.g. via the communication unit, in the case of the predetermined filling or limit level having been reached.

According to another advantageous embodiment of a method according to the invention, it may be provided that a signal exchange, e.g. a data handshake, is carried out between the measuring device and the control unit associated with the container and/or the filling or emptying device prior to or during the filling or emptying of the container with or of the filling material.

Details regarding the above-mentioned advantageous embodiments of the method were already described within the context of the discussion of advantageous embodiments of a measuring device according to the invention, which is why reference may be made at this point to the explanations in this respect.

It must be noted that the features cited individually in the claims can be combined with each other in any technologically meaningful manner (also across the boundaries of categories, e.g. between measuring device and method) and represent other embodiments of the invention. The description, in particular in connection with the figures, additionally characterizes and specifies the invention.

It may also be noted that a conjunction "and/or" used herein, which is situated between two features and links them to each other, should always be interpreted such that, in a first embodiment of the subject matter according to the invention, only the first feature may be provided, in a second embodiment, only the second feature may be provided, and in a third embodiment, both the first and the second feature may be provided.

DETAILED DESCRIPTION OF THE FIGURES

FIG. 1 shows a variant of arranging on a container 3 a measuring device 1 for detecting a filling or limit level. According to the variant shown, the measuring device 1 is screwed into a wall (with a wall section shown here) of the container 3, wherein a sensor 4 associated with the measuring device 1 is arranged in the inner space 10 of the container. As an alternative for the screw connection, the measuring device 1 may also be arranged in a different way on or in the container 3.

Figure 2:
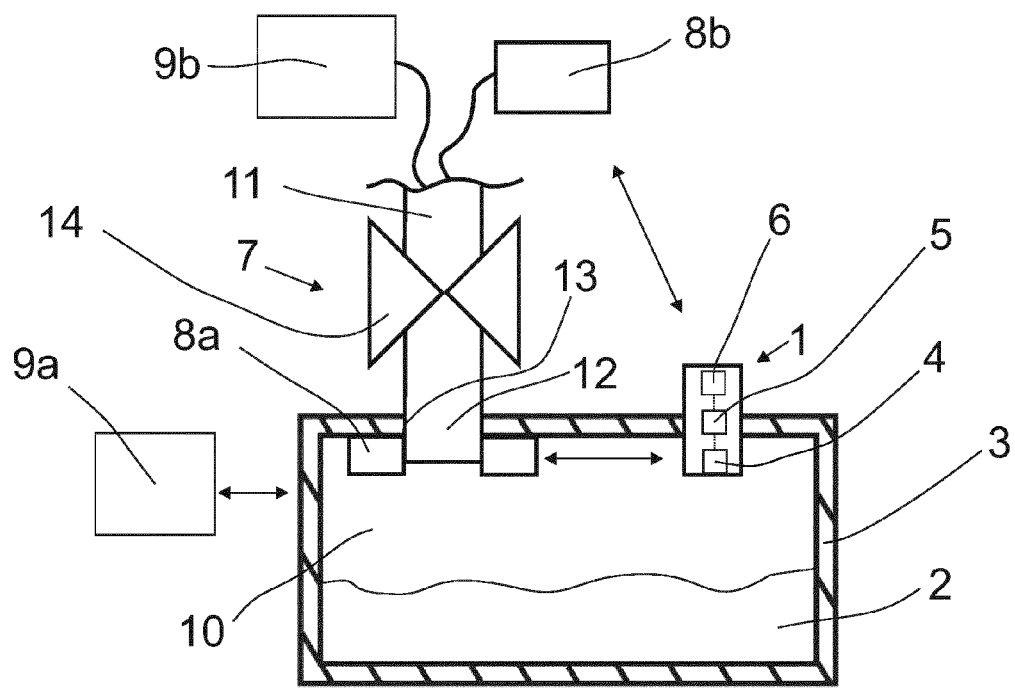
FIG. 2 is a schematic representation of the functional principle of a measuring device according to the invention, which is arranged on a container, during the filling or emptying of the container with a filling material via a filling or emptying device.

FIG. 2 shows, in a very schematic representation, the functional principle of a measuring device 1 arranged on a container 3, during the filling or emptying of the container 3 with a filling material 2 via a filling or emptying device 7. First, it is schematically depicted that the measuring device 1 comprises a plurality of different functional units, in particular a sensor 4, an energy supply unit 5 electrically connected to the sensor 4, and an activation unit 6, which is connected, with regard to signaling, at least to the energy supply unit 5. In addition, the measuring device advantageously has a communication unit (not shown).

For filling or emptying the container 3 with or of a filling material 2, the container 3 is connected to a filling or emptying device 7. The latter has a pipe 11 and a nozzle 12, which is inserted into or placed on a filling opening or an outlet opening 13 of the container 3. A valve 14, via which the filling material 2 is admitted to or discharged from the container 3, is disposed between the pipe 11 and the nozzle 12. The depicted position of the filling opening or outlet opening 13 is merely an example.

On the container 3 and/or the filling or emptying device 7, an actuating means 8a, 8b is provided, with which the activation unit 6 is actuated, e.g. mechanically or by means of a data transmission (here represented by the double-headed arrows), when the container 3 is being connected to the filling or emptying device 7, particularly when the nozzle 12 is placed in the filling opening or the outlet opening 13 of the container 3. Subsequent to the actuation, the activation unit 6 initiates an energy supply of the sensor 4, such that it is switched from an inactive mode into an operating mode. After the activation of the sensor 4, the latter can be used for a filling level or limit level measurement. The actuating unit 8a, 8b is activated by connecting the filling or emptying device 7 to the container 3, so that, subsequent to the filling or emptying device 7 being connected to the container 3, an activation chain up to the activation of the sensor 4 is triggered.

FIG. 2 also shows that a control unit 9a, 9b is associated with the container 3a and/or the filling or emptying device 7. The feed of filling material 2 into the container 3 or the discharge of filling material 2 from the container 3 is controlled by means of these control unit(s) 9a, 9b, particularly by opening a valve 14. For this purpose, the measuring device 1 is connected, with regard to signaling, to the control unit 9a, 9b associated with the container 3a and/or the filling or emptying device 7.

An example for a possible cooperation of the measuring device 1 and the control unit 9a, 9b is described below. Thus, a functionality test of the sensor 4 is preferably performed subsequent to the activation of the sensor 4 (i.e. after connecting the container 3 to the filling or emptying device 7), in which a functionality evaluation for determining a positive or negative functionality of the sensor 4 is carried out. If a positive functionality is determined, a filling or emptying enable signal is then forwarded to the control unit 9a, 9b associated with the container 3 and/or the filling or emptying device 7, subsequent to which the filling or emptying of the container 3 with filling material 2 is initiated, particularly by opening the valve 14 or a shut-off device (not shown) associated with the container 3.

In the case of an assertion performed by the measuring device 1 that a predetermined filling or limit level in the container 3 has been reached, a filling or emptying process termination signal is forwarded in the direction of the control unit 9a, 9b associated with the container 3 and/or the filling or emptying device 7. Since the control unit 9a, 9b is connected, with regard to signaling, to the valve 14 or the filling or emptying device 7, a filling process or emptying process can be terminated, in particular the valve 14 closed, by means of the control unit 9a, 9b. This also applies to the shut-off device (not shown) arranged on the container.

A data exchange between the measuring device 1, in particular a communication unit provided there, and the control unit 9a, 9b associated with the container 3 and/or the filling or emptying device 7, may take place also during the filling or during the emptying.

LIST OF REFERENCE NUMBERS

1 Measuring device
2 Filling material
3 Container
4 Sensor
5 Energy supply unit
6 Activation unit
7 Filling or emptying device
8a Actuating means
8b Actuating means
9a Control unit
9b Control unit
10 Inner space 11 Pipe
12 Nozzle
13 Filling opening or outlet opening
14 Valve Unless indicated otherwise, identical reference numbers in the figures identify identical components with the same function. The terms drive unit and drive are used interchangeably herein.

The references recited herein are incorporated herein in their entirety, particularly as they relate to teaching the level of ordinary skill in this art and for any disclosure necessary for the commoner understanding of the subject matter of the claimed invention. It will be clear to a person of ordinary skill in the art that the above embodiments may be altered or that insubstantial changes may be made without departing from the scope of the invention. Accordingly, the scope of the invention is determined by the scope of the following claims and their equitable equivalents.

I claim:

1. A method for filling or emptying a container with a filling material using a filling or emptying device and a measuring device, which is arranged on the container, wherein the measuring device comprises: a sensor for determining the filling or limit level, an energy supply unit, which is electrically connected to the sensor, and an activation unit, which is connected by a signaling connection at least to the energy supply unit, comprising the following steps:
   a) connecting the filling or emptying device to the container;
   b) actuating the activation unit by an actuating means provided on the container and/or the filling or emptying device, wherein the actuation takes place during or subsequent to step a), wherein the actuating means is activated by connecting the filling or emptying device to the container;
   c) subsequent to method step b): activating the sensor and switching the same from an inactive mode into an operating mode;
   d) performing a functionality test in which a functionality evaluation for determining a positive or negative functionality of the sensor and, in the case of a positive functionality, a filling or emptying enable signal is forwarded to a control unit associated with the container and/or to the filling or emptying device;
   e) filling or emptying the container with the filling material, wherein the filling or limit level is determined continuously or discontinuously using the sensor during the filling or emptying;
   f) upon reaching a predetermined filling or limit level, terminating the filling process; and
   g) after the termination of the filling process or emptying process, switching the sensor from an operating mode into an inactive mode.

2. The method according to claim 1, wherein the measuring device, subsequent to a respective determination of the filling or limit level, compares the determined filling or limit level with a predetermined filling or limit level, and that the measuring device forwards a filling or emptying process termination signal to the control unit associated with the container and/or the filling or emptying device in the case of the predetermined filling or limit level having been reached.

3. The method according to claim 1, further comprising wherein a signal exchange is carried out between the measuring device and the control unit, associated with the container and/or the filling or emptying device prior to or during the filling or emptying of the container with or of the filling material.

* * * * *